Dec. 4, 1928.   1,693,847
W. LEE
MACHINE FOR DECORTICATING, SCOURING, AND POLISHING CEREALS
Filed July 27, 1927    2 Sheets-Sheet 1

WORTHY LEE, Inventor

By David O. Barnell,
Attorney

Dec. 4, 1928.

W. LEE 1,693,847

MACHINE FOR DECORTICATING, SCOURING, AND POLISHING CEREALS

Filed July 27, 1927  2 Sheets-Sheet 2

Inventor

WORTHY LEE.

By David O. Barnell,

Attorney

Patented Dec. 4, 1928.

1,693,847

UNITED STATES PATENT OFFICE.

WORTHY LEE, OF COUNCIL BLUFFS, IOWA.

MACHINE FOR DECORTICATING, SCOURING, AND POLISHING CEREALS.

Application filed July 27, 1927. Serial No. 208,827.

My invention relates to machines for scouring, polishing and decorticating or removing the husk from cereals. It is the object of my invention to provide a machine for this general purpose, particularly adapted for use in the preparation of wheat for flour milling, and by which a larger proportion of high-grade flour may be produced from the grain than when the same is milled without the preliminary complete removal of the epidermal material, including an intermediate pigmentary layer, which is effected by the use of my invention. My invention provides a mechanism having coacting stationary and rotating rubbing devices adapted to receive the grain and to gradually advance the same through an operating zone in which the material, while subject to suitable pressure, is rolled, rubbed and scoured, largely by the friction of the kernels against each other, and in a manner such as to loosen and detach the fibrous epidermal layers thereof without abrasion of the underlying layer of gluten or proteid material. A further object of my invention is to provide in a machine of this class means for applying yielding pressure to the material, and for varying such pressure while the machine is in operation, whereby the friction or rubbing force of the kernels of grain against each other may be regulated to suit the particular material.

Figure 1:
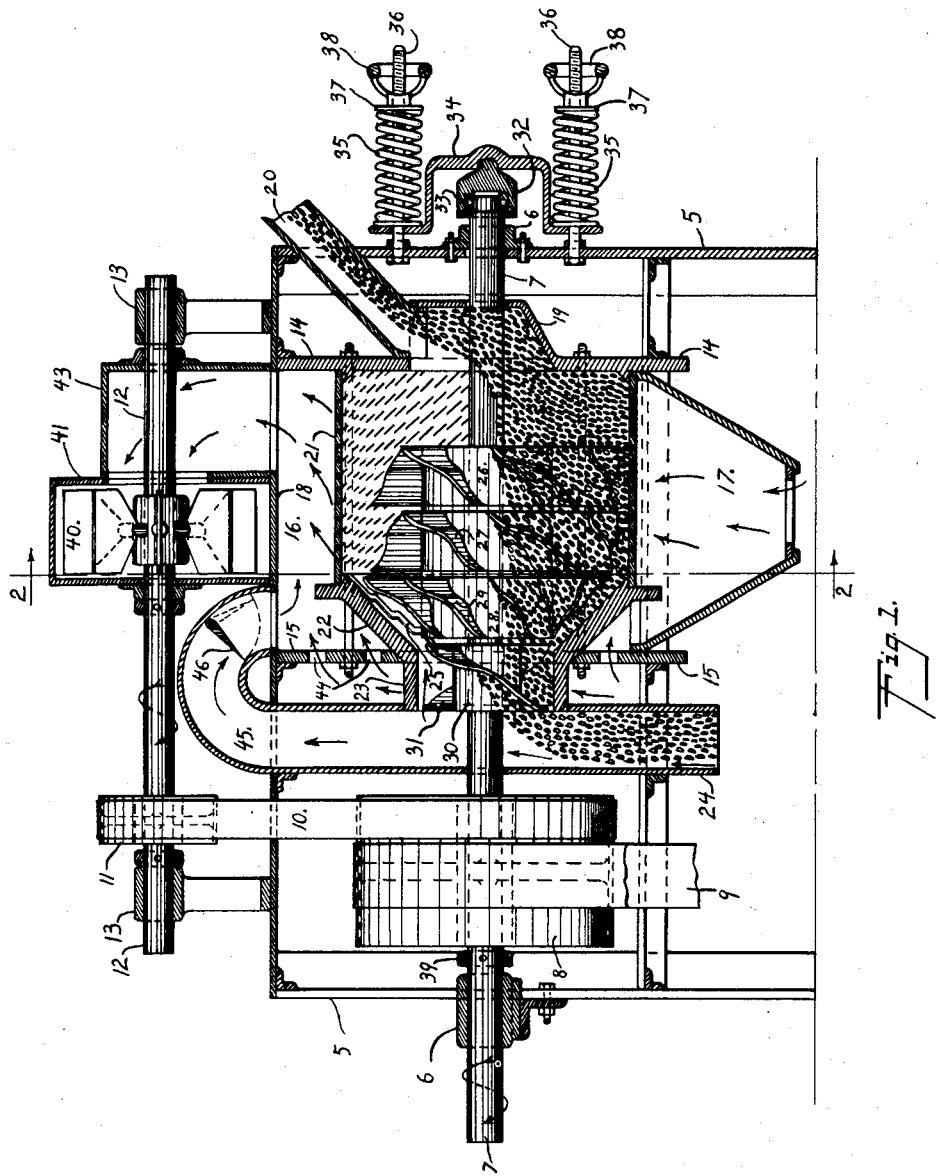
Figure 2:
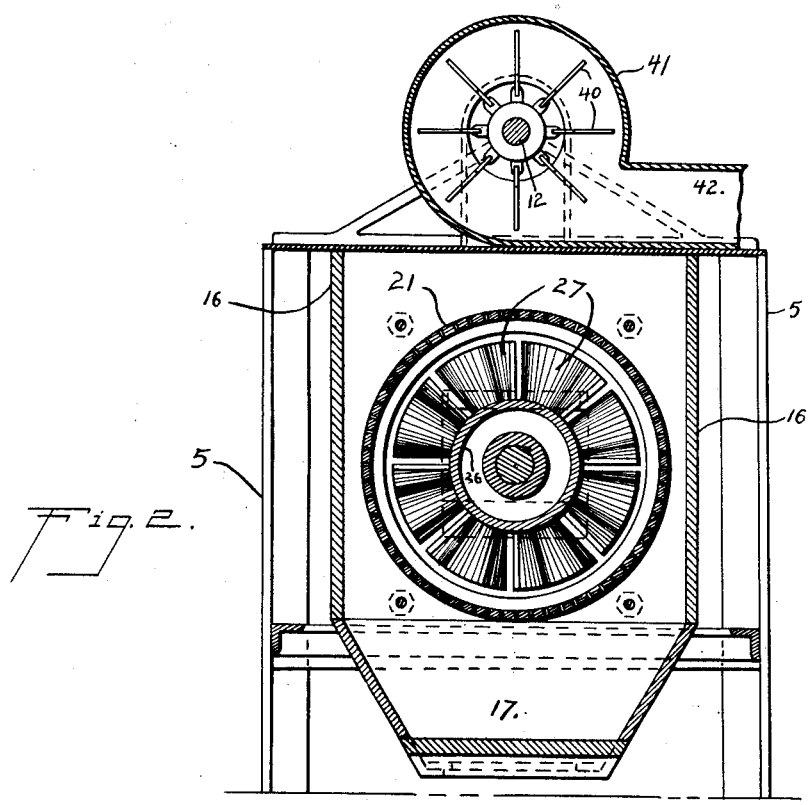
Figures 3, 4:
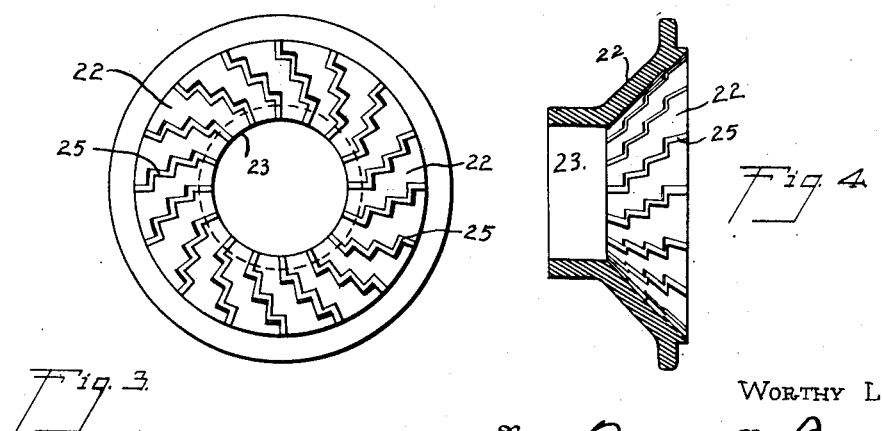

In the accompanying drawings Fig. 1 is a longitudinal vertical section of a machine embodying my invention, Fig. 2 is a transverse section thereof on the line 2—2 of Fig. 1, Fig. 3 is an end view of the stationary rubbing-cone, and Fig. 4 is a detail axial section of the same.

In carrying out my invention according to the illustrated embodiment thereof, I provide a suitable frame 5 carrying upon the intermediate portions of the ends thereof the bearings 6 for the main-shaft 7. A pulley 8 is secured upon said shaft 7 and is driven by a belt 9 from a suitable source of power. A belt 10 is extended from the pulley 8 to a smaller pulley 11 carried upon the fan-shaft 12 which is journaled in bearings 13 disposed upon the upper portion of the frame 5. The main-shaft 7 extends longitudinally through a housing carried within the frame 5 and formed by a front plate 14, a rear plate 15, side-plates 16, a bottom hopper 17, and a top-plate 18. The front plate 14 has formed integrally therewith the feed-hopper 19 to which is connected the feed-chute 20. Disposed concentrically about the shaft 7, and clamped between the front and rear housing-plates 14 and 15, is the scouring-cylinder comprising the cylindrical screen 21 and the hollow cone 22, the latter having a cylindrical neck-portion 23 which extends through the rear plate 15 and connects with the vertical discharge-chute 24. The screen 21 is preferably of perforate metal, having openings which are very narrow diagonally extending slits. The inner surface of the cone 22 is provided with a plurality of stepped ribs or projections 25, which are relatively thin and flat, the stepping of said ribs being formed by alternate portions extending circumferentially, or in planes at right angles to the axis of the conical surface, and portions extending longitudinally, or toward the apex of the conical surface. The rotary agitating and feeding devices are mounted upon the portion of the main shaft 7 within the chamber inclosed by the screen 21 and cone 22, and for convenience of construction said devices are made in a plurality of sections disposed serially upon the shaft. In the illustrated structure there are two of the sections within the cylindrical portion of the chamber, inclosed by the screen 21, each of said sections having a central cylindrical or drum-like portion 26, and a plurality of flanges or wings 27 extending outwardly from said portion 26. The flanges or wings 27 have a generally helical direction, but are wavy or undulating longitudinally as shown in Fig. 1, and the outer or peripheral edges extend to a cylindrical surface concentric with the shaft, as shown in Fig. 2. The section lying within the cone 22 has a central drum-like portion 28, similar to the portions 26 of the first sections, and wings or flanges 29 extending helically, and longitudinally waved similarly to the wings 27, but the outer longitudinal edges of the wings 29 are inclined to conform with the inclination of the adjacent inner surface of the cone 22. Within the cylindrical neck-portion 23 is a conveyor-section formed by a central drum 30, of smaller diameter than the drums 26 and 28, and longitudinally undulating helical wings 31 of which the outer edges are of uniform radius.

At the front end of the main shaft 7 is disposed a thrust-block 32, a ball thrust-bearing 33 being arranged between said block and the shaft. The block 32 is pressed yieldingly toward the end of the shaft by means of the yoke 34 which engages the semispherical end of the block, the ends of said yoke being engaged by coil springs 35 disposed around the tension-bolts 36. The outer ends of said springs engage collars 37 which are held in adjusted positions by the wheel-nuts 38 screwed on the threaded ends of the bolts 36. A collar 39 secured on the main shaft 7 adjacent to the rear bearing 6 limits the rearward longitudinal movement of the shaft which tends to result from the pressure of the thrust-block thereon, and prevents the wings 29 being pressed into engagement with the cone 22 or into shearing relation with the stepped ribs 25 on the conical surface.

A fan or air-impeller 40 is mounted on the shaft 12, the fan being inclosed by a suitable blower-casing 41 of which the tangential discharge-duct 42 is extended to any desired point. The intake duct 43 of the blower-casing connects with an opening in the top-plate 18 of the housing about the scouring-cylinder. Air is admitted to the housing through the opening of the hopper 17, through openings 44 in the rear plate 15 of the housing, through an air-trunk 45 extended up from and forming a continuation of the discharge-chute 24, and through the screen 21 from within the scouring-chamber, the air being inducted to said chamber through the feed and discharge openings thereof. A damper 46 is disposed in the air-trunk 45 for controlling the flow through the same, the arrangement being such that opening of said damper will reduce the volume of air drawn to the blower from the other sources above named, while increasing the suction through the discharge-chute 24.

The described mechanism is preferably used in connection with an improved method or process of milling wheat, which will be fully described and claimed in an application to be filed subsequently hereto. The preparation of the wheat for the decorticating and scouring operation consists in wetting the grain, preferably by immersion in water, five to ten minutes before the grain is to enter the machine, this being a sufficient time to thoroughly moisten and toughen the fibrous epidermal layers of the grain, without allowing any appreciable amount of moisture to be absorbed by the underlying hard gluten layers. Suitable agitation of the material during the immersion thereof serves to wash therefrom any external soluble substance, and to float away any chaff or other foreign matter of which the specific gravity is less than that of water. The moistened material is fed into the machine through the feed-chute 20, whence it passes by gravity into the scouring-cylinder. The main-shaft 7 is driven at a moderate speed, such as to avoid any considerable centrifugal action upon the material, which would have a tendency to scarify and abrade the fibrous epidermal layers without completely loosening and detaching the same from the denser underlying layers. The driving means for the fan-shaft are such that the same may be driven at a suitable speed for causing the desired air suction through the housing, without requiring that the main shaft be driven at a high speed. The volume of the grain delivered to the scouring-cylinder is so proportioned to the motion of the rotary agitating and feeding devices that the cylinder will be almost completely filled, and the material will be constantly crowded or pressed into the conical end of the cylinder, from which it will escape at a rate determined by the area of the opening between the conical surface and the rear end of the drum 28. The rubbing action by which the epidermal layers of the grain are detached whole, or in relatively large pieces, is commenced by the undulating helical wings 27 of the first agitator-sections, but as the material enters the cone 22 the rubbing pressure is increased, reaching a maximum just before the material passes the end of the drum 28 and into the discharge-neck 23. The rubbing pressure is varied to suit the particular material under treatment, by adjustments of the wheel-nuts 38 to increase or reduce the compression of the springs 35, and said springs serve to automatically maintain the desired pressure upon the material, should the rate of feed not be constant, by allowing the shaft to move slightly forward and back as the volume of material is increased and decreased, to similarly vary the area effective for discharge of the material at the rear end of the drum 28. The stepped projections 25 upon the conical end of the scouring-cylinder serve to retard the ejection of the material, whereby to build up the desired rubbing pressure in the zone of operation, without cracking or splitting the kernels of the grain or causing abrasion except of the toughened epidermal layers which it is desired to remove. The coarser or heavier material which passes through the screen 21 falls into the hopper 17 and is discharged through the bottom opening thereof. The finer and lighter material is carried by the air-currents to the blower-casing 41 and delivered therefrom to suitable collecting devices. Of the loosened and detached material which does not pass through the screen 21, and is thus carried to the discharge-chute 24, a considerable part may be carried up by the air-current through the air-trunk 45, and thereby delivered to the collecting means, the separation of the detached material at the discharge-chute being facilitated by the loosening and stirring of the material by the wings 31 while passing through the neck 23, after leaving the zone of rubbing pressure within the cone 22, and before entering the chute 24.

Preferably a plurality of the machines are employed, the same being arranged in series, so that the discharge from the first is fed to the second, and so on. Ordinarily three of the machines will serve to completely remove from the grain the fibrous epidermal layers, and also the thin layer of highly mineralized and dark-colored material which immediately underlies the true bran or outer layer of fibrous material. Said layer of mineralized material is soluble and is therefore loosened by the preliminary wetting of the grain for the time necessary to toughen the fibrous epidermal layers, without allowing time for the penetration of the moisture into the glutinous layer next underlying the same. Unles this intermediate layer of material, which is high in mineral content and coloring matter, is removed before the milling of the wheat into flour, substantially all of said pigmentary substance is unavoidably included in the flour, with the result that the same is darkened in color and lowered in grade. By the preliminary removal of said coloring and mineral matter, a larger amount of high-grade flour may be produced from the wheat, and a smaller amount of low-grade flour, shorts, bran, or other milling by-products which are of less value than the high-grade flour.

Now, having described my invention, what I claim and desire to secure by Letters Patent is:

1. In a machine of the class described, the combination with a horizontal main shaft, and a casing disposed concentrically about the same and comprising a perforate cylindrical portion and a conical end-portion; of agitating and feeding devices secured upon said shaft within said casing, each of said devices comprising a central drum and a plurality of undulating wings extending outwardly from said drum and having a generally helical direction about the same, the outer edges of said wings being substantially equidistant from the adjacent inner surfaces of the casing.

2. In a machine of the class described, a horizontally disposed perforate scouring-cylinder, a hollow cone arranged at one end of said cylinder and provided upon its inner surface with stepped projections, said cone having at its end a reduced cylindrical discharge-neck, means for feeding material into the end of the cylinder opposite said cone, rotary conveying and agitating means arranged concentrically within the cylinder, and a rotary scouring member arranged within said cone and restricting the opening to the discharge-neck, said member having wings adapted to coact with the stepped projections upon the conical surface to roll and rub the material while impelling the same toward the discharge-neck.

3. In a structure as set forth in claim 2, resilient means tending to move the rotary scouring member yieldingly toward the hollow cone, and means for limiting said movement to fix a minimum proximity of said members.

4. In a structure as set forth in claim 2, resilient means arranged to actuate the rotary scouring member yieldingly toward the hollow cone, and means for varying the effective force of said resilient means.

5. In a machine of the class described, the combination with a horizontally disposed scouring-cylinder having a conical end-portion, of a shaft arranged coaxially with said cylinder and mounted for rotation and for longitudinal movement, an agitating and impelling member carried by said shaft and having conically extending peripheral portions adapted for coaction with the conical end-portion of the cylinder, means for discharging material through the conical end-portion, means for feeding material to the opposite end of the cylinder, impelling and rubbing means for advancing the material toward the conical end of the cylinder, resilient thrust-members for pressing longitudinally upon the shaft to move the conical agitating and impelling member yieldingly toward the conical end of the cylinder, and means for limiting the longitudinal movement of the shaft.

WORTHY LEE.